(No Model.)
W. LYNCH & E. TREMPER.
MOTOR SPRING FORK FOR BICYCLES.
No. 480,599. Patented Aug. 9, 1892.
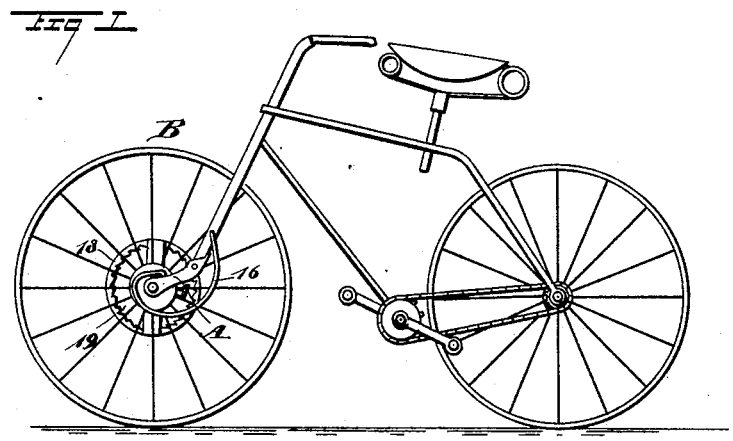
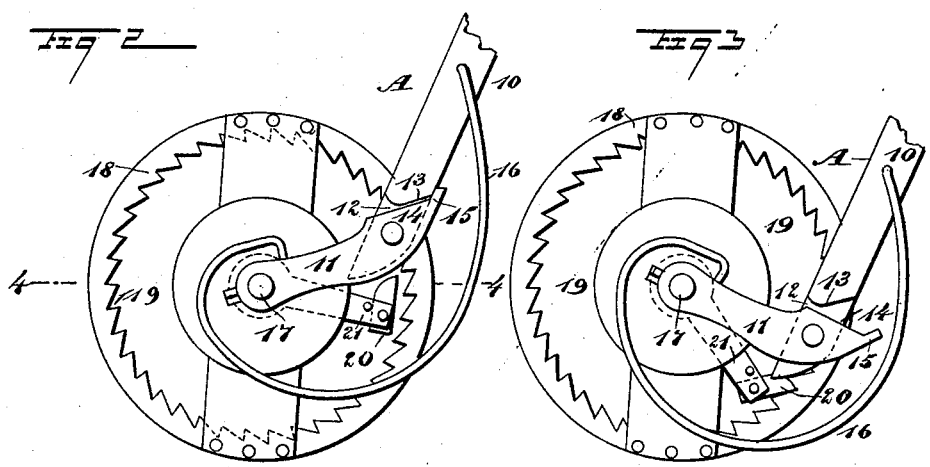
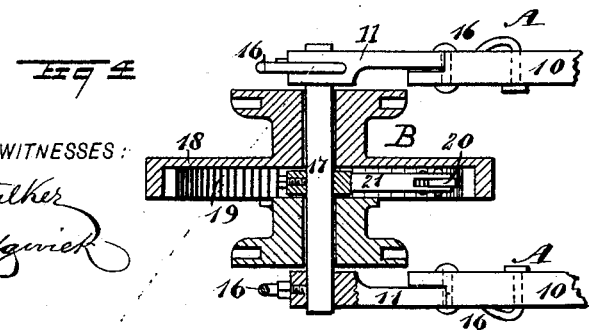
WITNESSES:
H. Walker
C. Sedgwick
INVENTORS,
W. Lynch
E. Tremper
BY Munn & Co.
ATTORNEYS

UNITED STATES PATENT OFFICE.

WILLIAM LYNCH AND EUGENE TREMPER, OF WALLKILL, NEW YORK.

MOTOR SPRING-FORK FOR BICYCLES.

SPECIFICATION forming part of Letters Patent No. 480,599, dated August 9, 1892.

Application filed November 20, 1891. Serial No. 412,546. (No model.)

*To all whom it may concern:*

Be it known that we, WILLIAM LYNCH and EUGENE TREMPER, of Wallkill, in the county of Ulster and State of New York, have invented a new and Improved Motor Spring-Fork for Bicycles and Like Machines, of which the following is a full, clear, and exact description.

Our invention relates to a spring-fork for bicycles and like machines, and has for its object to so construct the fork that it will be exceedingly simple and durable and will act effectively as a cushion for the rider when the wheel is passing over any obstruction or over rough ground; and a further object of the invention is to so construct the fork that, in addition to its functions as a cushion, it will act, also, as a motor to propel the wheel forward the moment any obstruction is encountered, thus preventing loss of headway.

Another object of the invention is to provide a spring-fork which may be used at all times upon the wheel without interfering in the least with it when the machine is driven at racing speed.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of a bicycle having the invention applied thereto. Fig. 2 is a side elevation of the body portion of the fork, the position of the parts being such that the wheel is as free to turn in either direction as though the fork were not connected therewith. Fig. 3 is a similar view to Fig. 2, the parts of the fork, however, being shown in the position they assume immediately at the time the obstruction is encountered; and Fig. 4 is a section taken practically on the line 4 4 of Fig. 2.

The fork A, which is adapted for attachment to the backbone of the vehicle, as shown in Fig. 1, is constructed in two sections 10 and 11, the upper section being practically U-shaped and the lower section consisting of two bars, one attached to each member of the upper section 10. The attachment between the bars constituting the lower section and the upper section of the fork is a pivotal one, and where the two sections engage one with the other the upper section upon the outer face of its members is provided with a recess 12, the upper walls of which recesses are somewhat irregular, as shown at 13 in Figs. 2 and 3, one portion of the wall being cylindric and the other portion beveled, and the upper faces of the bars 11, comprising the lower section, are beveled off, as illustrated at 14, and are provided with an extension or shoe 15 at one side. When the sections of the fork are in their normal position, the beveled surfaces of the bars constituting the lower section are in engagement with the beveled surfaces of the members of the upper section, as shown in Fig. 2, and the shoes engage with one side edge of the upper section, the beveled surfaces 13 and 14 and the shoes 15 constituting stops.

The two sections of the fork are held in the above position—that is, their normal position—through the medium of springs 16, two of which are employed. These springs are very simple in their character, one end of a spring being introduced in the upper edge of each bar comprising the lower section of the fork, the said springs being curved forwardly, thence downwardly and upwardly, and their inner ends are attached in any suitable or approved manner to the upper faces of the members of the upper section 10 of the fork. The position of these springs and their shape are fully illustrated in Figs. 1, 2, and 3.

The bars comprising the lower section of the fork are attached in any approved manner to the front axle 17 of the machine, upon which axle the front wheel B is loosely mounted. The hub of this wheel is peculiarly constructed, being provided with a central casing 18, the said casing being located within the line of spokes and comprising an integral portion of the hub. The casing 18 is provided upon its inner circumferential face with a series of teeth 19, as shown in Figs. 2 and 3, the said teeth being inclined, whereby the casing virtually constitutes a ratchet, and its teeth are engaged under certain circumstances by a pawl 20, the said pawl being pivoted upon the outer end of an arm 21, which arm is fast to the axle 17 within the casing, as is shown in Fig. 4, the attachment between the arm and the axle being usually effected by means of a set-screw. Normally the pawl 20 is out of engagement with the ratchet, and its inner movement is limited by a stud carried by the arm 21. It will be observed that the ratchet turns freely upon the axle, while the arm 21 turns with the axle and the fork A operates directly in conjunction with the axle.

In passing over rough ground, when the wheel passes over an obstruction or enters a rut, the upper section of the fork is forced downward, carrying the lower section to the position shown in Fig. 3, and as the wheel revolves by centrifugal force the pawl 20 is thrown in engagement with the ratchet-teeth, sliding over said teeth as the wheel turns forward, and the springs 16 are compressed in such a manner that they form an exceedingly-effective cushion and prevent the rider from sustaining any shock. The springs act very gradually and effectively, and the pawl is not only thrown in engagement with the ratchet by centrifugal force, but also by reason of the center of gravity falling outside its pivotal base as the arm is forced downward, in conjunction with the fork, upon the wheel reaching an obstruction. The moment that the wheel has passed the obstruction the fork resumes its normal position, being carried upward by the recoil of the springs, and this action of the springs also operates the moment that the obstruction is encountered or passed to rock the axle 17, as it is in direct communication with the fork, and the rocking motion of the axle is communicated to the pawl-carrying arm 21, and the pawl at that moment acts as a motor, forcing the wheel around. Thus the momentum of the wheel is not at all lessened by reason of the obstacle it has encountered and which it has passed.

This fork is rendered exceedingly effective, owing to the fact that it combines in a superior manner all the advantages that a spring-fork should possess, together with the advantage that it acts as a motor at the time when the wheel most needs the help of such a device.

It will be understood that in practice the casing will be inclosed upon both sides, so as to prevent any foreign matter—such as dust, twigs, leaves, &c.—from entering it, which foreign matter would be likely to interfere with the proper action of the pawl in connection with the ratchet.

Having thus described our invention, we claim as new and desire to secure by Letters Patent—

1. A spring-fork for bicycles, constructed in pivoted spring-connected sections, and a pawl-and-ratchet mechanism connecting the lower section of the fork with the wheel, substantially as set forth.

2. A spring-fork and motors for bicycles and like machines, constructed in two sections, the upper section being yoke-shaped and the lower section comprising two bars pivoted to the members of the yoke and adapted for attachment to the axle, power connections between said lower section and the wheel, stop devices located at the junction of the two sections, and a spring attached to the lower section, coiled over the same, and secured to the upper section, as and for the purpose set forth.

3. In a bicycle or like machine, the combination, with the axle of the machine, of a fork constructed in two sections, a bow-section, and bars pivoted to the bow-section, the said bars being adapted for attachment to the axle and having power connections with the wheel, stop devices, substantially as described, located at the junction of the two sections of the fork, and springs attached to the bars of the fork, curved forwardly and over said bars and inwardly to an engagement with the yoke-section of the fork, as and for the purpose specified.

4. In a bicycle, the combination, with the axle and a wheel mounted upon said axle, having a casing attached thereto provided with an inner ratchet-face, of a spring-fork attached to the axle, the said fork being constructed in two pivotally-connected sections, stop devices located at the junction of the sections, springs exerting tension upon the sections of the fork in the direction of the stop devices, an arm attached to the axle, and a pawl carried by said arm and capable of engagement with the ratchet-teeth of the wheel, as and for the purpose set forth.

5. In a bicyle or like device, the combination, with the axle thereof, the wheel loosely mounted upon the axle, and a casing secured to the hub of the wheel and having ratchet-teeth produced upon its inner peripheral surface, of a fork consisting of a yoke-section and bars pivotally attached to the members of the yoke-section, the said bars and members being provided with stop devices and the bars being adapted for rigid attachment to the axle, one at each side of the wheel-hub, springs attached to the bars at their upper forward edges, which springs are curved over the ends of the bars downward and upward to an engagement with the sides of the members of the yoke-section of the fork, an arm secured to the axle and located within the casing, and a pawl pivoted upon the said arm and adapted for engagement with the ratchet-surface of the casing, as and for the purpose specified.

WM. LYNCH.
EUGENE TREMPER.

Witnesses:
FRANK J. WILKIN,
ALEXANDER PETRIE.